United States Patent [19]

Wick

[11] Patent Number: 4,524,168
[45] Date of Patent: Jun. 18, 1985

[54] PROCESS FOR THE MASS COLORATION OF POLYMERS

[75] Inventor: Arnold Wick, Therwil, Switzerland

[73] Assignee: Ciba-Geigy Corporation, Ardsley, N.Y.

[21] Appl. No.: 439,684

[22] Filed: Nov. 8, 1982

[30] Foreign Application Priority Data

Nov. 18, 1981 [CH] Switzerland ............... 7411/81

[51] Int. Cl.³ ............................................. C08K 5/34
[52] U.S. Cl. ................................ 524/190; 534/788; 534/819; 534/850; 534/860
[58] Field of Search ......................................... 524/190

[56] References Cited

U.S. PATENT DOCUMENTS

| 3,585,039 | 6/1971 | Kabitzke et al. | 96/99 |
| 3,904,596 | 9/1975 | Blackwell et al. | 260/187 |
| 4,145,341 | 3/1979 | Dehnert et al. | 260/270 |
| 4,187,218 | 2/1980 | Merlo et al. | 260/270 |
| 4,202,814 | 5/1980 | Lierhard | 524/190 |

FOREIGN PATENT DOCUMENTS

| 0022744 | 2/1976 | Japan . |
| 2030165A | 4/1980 | United Kingdom . |
| 2030166A | 4/1980 | United Kingdom . |

OTHER PUBLICATIONS

Chem. Abstract No. 85913h, Azo Dyes for an in Photographic Material, Piller et al., p. 40, 1968.
Chem. Abstract No. 78534d, 2,4-Dinitro-4′-Aminoazobenzine, Groeski, 1970, vol. 73(16).
Chem. Abstract No. 122949y, Azo Photographic Dyes, Piller, vol. 72(24), 1968.
Chem. Abstract No. 25665q, Photographic Light Sensitive Material Containing a Triozo Dye, vol. 79, 1973.
Chem. Abstract No. 103296v, Fiber Reactive Dyes, Siegel et al., vol. 77, 1972.

Primary Examiner—John Kight
Assistant Examiner—Garnette D. Draper
Attorney, Agent, or Firm—Harry Falber

[57] ABSTRACT

Compounds of the formula

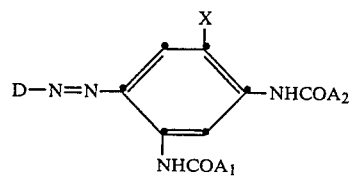

wherein the symbols D is the radical of a carbocyclic or heterocyclic diazo component, X is hydrogen, halogen, methyl or methoxy, each of $A_1$ and $A_2$ independently of the other is unsubstituted phenyl or phenyl which is substituted by halogen, $C_1$–$C_4$ alkyl, methoxy, ethoxy, phenyl or phenoxy, are suitable for the mass coloration of organic polymers.

9 Claims, No Drawings

PROCESS FOR THE MASS COLORATION OF POLYMERS

The present invention relates to the mass coloration of organic polymers with selected azo dyes and to the organic polymers coloured with these dyes.

Up to now, the dyes for the mass coloration of organic polymers, especially polyesters, have usually been selected from known classes of azo dyes, in particular from the group of textile disperse dyes. For examples, UK Patent Applications GB 2030 165 A and 2 030 166 A describe monoazo disperse dyes with secondary amines as coupling components, which dyes may be used for the mass coloration of synthetic textile materials, especially of polyesters. Such dyes, however, especially when used in the mass coloration of polyesters, have too low a resistance to dry heat, rubbing and bleeding before, during or after the thermo setting of the coloured polymers, and have an insufficient heat resistance during processing.

It has now been found that simple azo dyes which are without importance as disperse dyes or pigments, are most suitable for the mass coloration of organic polymers, in particular of polyesters and polyamides. These azo dyes have in particular excellent heat stability.

Accordingly, the present invention relates to a process for the mass coloration of organic polymers, which process comprises the use of a compound of the formula I

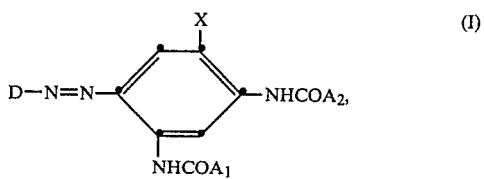

wherein D is the radical of a carbocyclic aromatic or heterocyclic aromatic diazo component, X is hydrogen, halogen, methyl or methoxy, and each of $A_1$ and $A_2$ independently of the other is $C_1$–$C_6$alkyl, phenyl or phenyl which is substituted by halogen, $C_1$–$C_4$alkyl, methoxy, ethoxy, phenyl or phenoxy.

The diazo component from which D is derived may be unsubstituted or substituted. Possible substituents are e.g. halogen, $C_1$–$C_6$alkyl, $C_1$–$C_6$alkoxy, trifluoromethyl, cyano, nitro, unsubstituted phenyl, unsubstituted phenoxy, or phenyl or phenoxy each substituted by halogen, $C_1$–$C_6$alkyl, $C_1$–$C_6$alkoxy, trifluoromethyl or phenylazo.

Examples of diazo components from which D is derived are: aniline, 2-toluidine, 3-toluidine, 4-toluidine, 2-ethylaniline, 3-ethylaniline, 4-ethylaniline, 2,3-dimethylaniline, 2,4-dimethylaniline, 2,5-dimethylaniline, 3,4-dimethylaniline, 2-chloroaniline, 3-chloroaniline, 4-chloroaniline, 2,3-dichloroaniline, 2,4-dichloroaniline, 2,5-dichloroaniline, 3,4-dichloroaniline, 3,5-dichloroaniline, 2,4,5-trichloroaniline, 2,3,4-trichloroaniline, 3,4,5-trichloroaniline, 2-methyl-3-chloroaniline, 2-methyl-4-chloroaniline, 2-methyl-5-chloroaniline, 3-chloro-4-methylaniline, 3-chloro-4,6-dimethylaniline, 3-chloro-4-methoxyaniline, 3-chloro-6-methoxyaniline, 4-methoxyaniline, 2-methyl-4-methoxyaniline, 2-methoxy-5-methylaniline, 4-ethoxyaniline, 4-phenoxyaniline, 4-(4'-chlorophenoxy)-aniline, 4-aminobenzomethylamide, 2-trifluoromethylaniline, 3-trifluoromethylaniline, 4-trifluoromethylaniline, 2-chloro-5-trifluoromethylaniline, 2,4-dimethoxy-5-chloroaniline, 2,5-dimethoxy-4-chloroaniline, 2-aminobenzonitrile, 3-aminobenzonitrile, 4-aminobenzonitrile, 2-cyano-4-chloroaniline, 4-aminoacetanilide, 4-aminoazobenzene, 1-aminonaphthalene, 2-amino-6-methoxybenzthiazole, 2-amino-6-ethoxybenzthiazole, 2-amino-6-chlorobenzthiazole, methyl 2-amino-3-cyano-4-methylthiophene-6-carboxylate, 5-amino-3-phenyl-1,2,4-thiadiazole, 2-amino-5-phenyl-1,3,4-thiadiazole, 2-aminobenzimidazole, 2-amino-1-methylbenzimidazole and 2-amino-1-ethylbenzimidazole.

In the definitions of D, X, $A_1$ and $A_2$, halogen may be e.g. fluorine, chlorine or bromine, with chlorine being preferred.

$C_1$–$C_6$Alkyl in the definitions of D, $A_1$ and $A_2$ may be straight chain or branched and is in particular methyl, ethyl, isopropyl, sec-butyl, tert-butyl, tert-amyl or n-hexyl.

$C_1$–$C_4$Alkyl in the definitions of $A_1$ and $A_2$ may be straight chain or branched and is in particular methyl, ethyl, isopropyl, sec-butyl or tert-butyl.

$C_1$–$C_6$Alkoxy in the definition of D may be straight chain or branched and is in particular methoxy, ethoxy, propoxy, isopropoxy, n-butoxy, n-pentoxy or n-hexoxy.

In preferred compounds of the formula I, D is the radical of a carbocyclic aromatic diazo component, preferably phenyl. Phenyl as defined by D is in particular phenyl substituted by methyl, ethyl, methoxy, ethoxy, phenoxy, chlorine, cyano, nitro, phenylazo or trifluoromethyl. If the phenyl nucleus contains two substituents, one is preferably methyl or chlorine and the other may be one of the group cited above.

Accordingly, in the process of the present invention it is preferred to use compounds of the formula I, wherein D is unsubstituted phenyl or phenyl which is substituted by one or two identical or different members selected from the group consisting of halogen, $C_1$–$C_6$alkyl, $C_1$–$C_6$alkoxy, phenoxy, cyano, nitro, phenylazo and trifluoromethyl, and X is hydrogen, halogen, methyl or methoxy, and each of $A_1$ and $A_2$ independently of the other is $C_1$–$C_6$alkyl, phenyl or phenyl which is substituted by halogen, $C_1$–$C_4$alkyl, methoxy, ethoxy, phenyl or phenoxy.

It is particularly preferred to use compounds of the formula I, wherein D is unsubstituted phenyl or phenyl which is substituted by one or two identical or different members selected from the group consisting of chlorine, $C_1$–$C_3$alkyl, $C_1$–$C_3$alkoxy, phenoxy, cyano, nitro, phenylazo and trifluoromethyl, and X is hydrogen, chlorine, methyl or methoxy, and each of $A_1$ and $A_2$ independently of the other is $C_1$–$C_3$alkyl, unsubstituted phenyl or phenyl which is substituted by chlorine, $C_1$–$C_4$alkyl, methoxy, ethoxy or phenyl.

It is more preferred to use compounds of the formula I, wherein D is unsubstituted phenyl or phenyl which is substituted by one or two identical or different members selected from the group consisting of chlorine, methyl, ethyl, methoxy, ethoxy, phenoxy, cyano, nitro, phenylazo and trifluoromethyl, and X is hydrogen, and $A_1$ and $A_2$ are the same and are unsubstituted phenyl or phenyl which is substituted by a methyl, tert-butyl or phenyl group or by one or two chlorine atoms.

It is most preferred to use compounds of the formula I, wherein D is phenyl which is substituted by one or two chlorine atoms and X is hydrogen, $A_1$ and $A_2$ are the same and are unsubstituted phenyl or phenyl which is substituted by one chlorine atom.

The compounds of the formula I to be used in the process of the invention may be prepared by e.g. diazotising an amine of the formula

DNH$_2$ wherein D has the meaning assigned to it above, and coupling the diazonium compound to a compound of the formula II

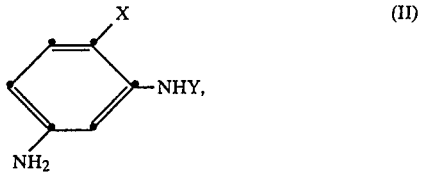

wherein X is as defined above and Y is hydrogen or —COA$_1$, wherein A$_1$ is as defined above, and acylating the resultant mono- or diaminoazo compound with a corresponding aliphatic acid chloride, anhydride or with a benzoyl chloride which is unsubstituted or substituted by halogen, C$_1$–C$_4$alkyl, methoxy, ethoxy, phenyl or phenoxy, or with a mixture of differently substituted benzoyl chlorides.

Examples of aliphatic acid chlorides, anhydrides and substituted benzoyl chlorides are: acetyl chloride, propionyl chloride, butyryl chloride, acetic anhydride, 2-methylbenzoyl chloride, 3-methylbenzoyl chloride, 4-methylbenzoyl chloride, 2-chlorobenzoyl chloride, 3-chlorobenzoyl chloride, 4-chlorobenzoyl chloride, 2,4-dichlorobenzoyl chloride, 3,4-dichlorobenzoyl chloride, 2,5-dichlorobenzoyl chloride, 4-tert-butylbenzoyl chloride, 4-methoxybenzoyl chloride and 4-phenylbenzoyl chloride.

The acylation may be carried out in an inert solvent such as toluene, xylene, chlorobenzene, dichlorobenzene, or in a mixture of aromatic hydrocarbons, at elevated temperature, if appropriate in the presence of an acid acceptor such as triethylamine, pyridine, N,N-dimethylaniline or N,N-diethylaniline.

The invention also relates to the novel compounds of the formula I

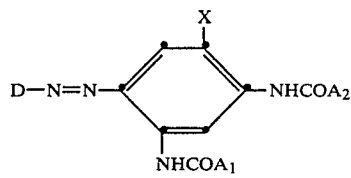

wherein D is the radical of a carbocyclic or heterocyclic diazo component, X is hydrogen, halogen, methyl or methoxy, each of A$_1$ and A$_2$ independently of the other is unsubstituted phenyl or phenyl which is substituted by halogen, C$_1$–C$_4$alkyl, methoxy, ethoxy, phenyl or phenoxy.

Particularly interesting compounds of the formula I are those in which D is the radical of a carbocyclic diazo component, in particular unsubstituted phenyl or phenyl which is substituted by one or two identical or different members selected from the group consisting of halogen, C$_1$–C$_6$alkyl, C$_1$–C$_6$alkoxy, phenoxy, cyano, nitro, phenylazo and trifluoromethyl, and X, A$_1$ and A$_2$ have the meanings previously assigned to them in respect of the novel compounds of the formula I.

In the novel compounds of the formula I, halogen, C$_1$–C$_4$alkyl, C$_1$–C$_6$alkyl and C$_1$–C$_6$alkoxy may have the meanings assigned to them previously on page 3.

Examples of organic polymers which may be coloured with the compounds of formula I are cellulose ethers and cellulose esters such as ethyl cellulose, cellulose acetate, cellulose butyrate, polyurethanes, natural resins or synthetic resins such as polymerisation resins or condensation resins, e.g. aminoplasts, especially urea/formaldehyde resins and melamine/formaldehyde resins, alkyd resins, phenolic plastics, polycarbonates, polyolefins such as polystyrene and styrene copolymers such as ABS, polyacrylates, rubber, casein, silicone and silicone resins, but preferably polyesters and polyamides. These organic polymers may be coloured individually or in admixture.

Suitable linear polyesters are in particular those which are obtained by polycondensation of terephthalic acid or an ester thereof with a glycol of the formula HO—(CH$_2$)$_n$—OH, in which n is an integer from 2 to 10, or with 1,4-di(hydroxymethyl)cyclohexane, or by polycondensation of a glycol ether of a hydroxybenzoic acid, for example p-(β-hydroxyethoxy)-benzoic acid. The term "linear polyesters" also comprises copolyesters which are obtained by partial replacement of terephthalic acid by another dicarboxylic acid and/or by partial replacement of the glycol by another diol. However the preferred linear polyesters are polyethylene terephthalates.

Suitable polyamides are in particular linear polyamides, e.g. those which may be obtained from ε-caprolactam (polyamide-6), ω-aminoundecanoic acid (polyamide-11), ω-laurolactam (polyamide-12) hexamethylenediamine and adipic acid (polyamide-6,6) or from other aliphatic or aromatic starting materials. Copolyamides are also suitable, e.g. from ε-caprolactam, hexamethylenediamine and adipic acid. However, polyamide-6 and polyamide-6,6 are particularly preferred.

For mass coloration, the organic polymers are preferably homogeneously mixed in the form of powders, chips or granules with the dye. This may be accomplished e.g. by coating the polymer particles with the finely divided dry dye powder or by treating the polymer particles with a solution or dispersion of the dye in an organic solvent and subsequently removing the solvent. It is preferred to use 0.1 to 10% by weight of the dye of formula I, based on the organic polymer to be coloured.

The coloured polymeric materials may be fused by known methods in an extruder and pressed e.g. to foils or filaments or cast to sheets.

The yellow colorations obtained have pronounced colour strength and brilliance, excellent fastness to light, rubbing, thermo setting, wet and dry cleaning and bleeding, and also have good solubility, transparency and resistance to alkali.

The invention is illustrated by the following Examples.

EXAMPLE 1

An undulled polyethylene terephthalate granulate suitable for fibre manufacture is shaken in a closed vessel for 15 minutes on a mechanical shaker together with 1% by weight of the dye of the formula

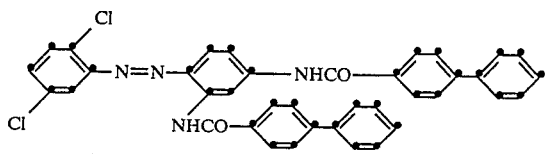

The uniformly coloured granules are then spun in a melt spinning machine (285° C.±3° C., sojourn time in the spinning machine about 5 minutes) to filaments, which are stretched and wound on a draw twister. The resultant brilliant yellow coloration has excellent lightfastness and excellent fastness to washing, dry cleaning, cross-dyeing, sublimation and very good rubfastness after thermosetting of the coloured material.

The dye used in this Example can be prepared by acylation of 2,4-diamino-2′,5′-dichloroazobenzene with diphenylcarboxylic chloride in boiling chlorobenzene. It is obtained in high yield in the form of yellow crystal needles with a melting point of 302° C.

| Microanalysis: | | | | |
|---|---|---|---|---|
| calculated: | C 71.14 | H 4.09 | Cl 11.05 | N 8.73% |
| found: | C 71.3 | H 4.1 | Cl 11.3 | N 8.8% |

EXAMPLES 2 TO 111

Good colorations are also obtained by repeating the procedure of Example 1 and using, instead of the dye employed in Example 1, one of the dyes listed in Table 1.

TABLE 1

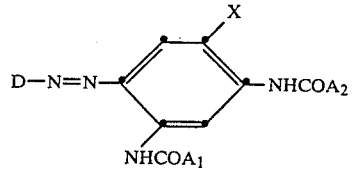

| Example | D | $A_1 = A_2$ | X | m.p. °C. | Shade in PES |
|---|---|---|---|---|---|
| 2 | phenyl | phenyl | H | 232–33 | yellow |
| 3 | " | 3-methylphenyl | H | 185–87 | yellow |
| 4 | " | 4-methylphenyl | H | 247–49 | yellow |
| 5 | " | 4-chlorophenyl | —CH₃ | 296–97 | yellow |
| 6 | 2-chlorophenyl | phenyl | H | 214–15 | yellow |
| 7 | " | 3-methylphenyl | H | 214–15 | yellow |
| 8 | " | 4-methylphenyl | H | 210–11 | yellow |
| 9 | " | 4-chlorophenyl | H | 239–40 | yellow |
| 10 | " | 4-tert.butyl-phenyl | H | 170–72 | yellow |
| 11 | " | 4-phenylphenyl | H | 233–34 | yellow |
| 12 | 3-chlorophenyl | phenyl | H | 212–14 | yellow |
| 13 | " | 3-methylphenyl | H | 179–80 | yellow |
| 14 | " | 4-methylphenyl | H | 239–40 | yellow |
| 15 | " | 4-chlorophenyl | H | 255–56 | yellow |
| 16 | " | 4-phenylphenyl | H | 300–01 | yellow |
| 17 | 4-chlorophenyl | phenyl | H | 258–59 | yellow |
| 18 | " | 3-methylphenyl | H | 210–11 | yellow |
| 19 | " | 4-methylphenyl | H | 258–59 | yellow |
| 20 | " | 4-tert.butyl-phenyl | H | 216–17 | yellow |
| 21 | " | 4-chlorophenyl | H | 259–61 | yellow |
| 22 | " | 4-phenylphenyl | H | 285–86 | yellow |
| 23 | 2,3-dichlorophenyl | phenyl | H | 252–53 | yellow |
| 24 | " | 3-methylphenyl | H | 236–37 | yellow |
| 25 | " | 4-tert.butyl-phenyl | H | 146–49 | yellow |
| 26 | " | 4-chlorophenyl | H | 251–52 | yellow |
| 27 | " | 4-phenylphenyl | H | 260–61 | yellow |
| 28 | 2,5-dichlorophenyl | phenyl | H | 254–55 | yellow |
| 29 | " | 3-methylphenyl | H | 217–18 | yellow |
| 30 | " | 4-methylphenyl | H | 244–45 | yellow |
| 31 | " | 4-tert.butyl-phenyl | H | 254–57 | yellow |
| 32 | " | 4-chlorophenyl | H | 251–52 | yellow |
| 33 | 3,4-dichlorophenyl | 3-methylphenyl | H | 248–55 | yellow |
| 34 | " | 4-tert.butyl-phenyl | H | 198–201 | yellow |
| 35 | 3,5-dichlorophenyl | 3-methylphenyl | H | 190–91 | yellow |
| 36 | " | 4-methylphenyl | H | 239–40 | yellow |
| 37 | " | 4-tert.butyl-phenyl | H | 219–20 | yellow |
| 38 | 2,4-dimethylphenyl | 4-methylphenyl | H | 202–03 | yellow |
| 39 | " | 4-tert.butyl-phenyl | H | 155–59 | yellow |
| 40 | " | 4-phenylphenyl | H | 243–44 | yellow |
| 41 | 3-chloro-2-methylphenyl | 3-methylphenyl | H | 164–65 | yellow |
| 42 | 2-chloro-5-methylphenyl | phenyl | H | 203 | yellow |
| 43 | 2-chloro-4-methylphenyl | phenyl | H | 233–34 | yellow |

TABLE 1-continued

D—N=N—⟨ring with X, NHCOA₁, NHCOA₂⟩

| Example | D | A₁ = A₂ | X | m.p. °C. | Shade in PES |
|---|---|---|---|---|---|
| 44 | 3-chloro-4,6-dimethyl-phenyl | phenyl | H | 262–63 | yellow |
| 45 | 3-chloro-4,6-dimethyl-phenyl | 3-methylphenyl | H | 221–22 | yellow |
| 46 | 3-chloro-4,6-dimethoxy-phenyl | 4-chlorophenyl | H | 295 | yellow |
| 47 | 4-phenoxy-phenyl | phenyl | H | 243–44 | yellow |
| 48 | " | 3-methylphenyl | H | 185–90 | yellow |
| 49 | " | 4-methylphenyl | H | 234–40 | yellow |
| 50 | " | 4-chlorophenyl | H | 243–44 | yellow |
| 51 | 4-chloro-2-cyanophenyl | 4-methoxyphenyl | H | 273–74 | yellow orange |
| 52 | 4-methylaminocarbonyl-phenyl | phenyl | H | 307–08 | yellow |
| 53 | 4-methylaminocarbonyl-phenyl | 4-chlorophenyl | H | >310 | yellow |
| 54 | 1-naphthyl | 4-methylphenyl | H | 208–09 | yellow |
| 55 | " | 4-phenylphenyl | H | 265–66 | golden yellow |
| 56 | 4-nitrophenyl | phenyl | H | 293–94 | orange |
| 57 | " | 4-chlorophenyl | H | 313–14 | orange |
| 58 | " | 3-methylphenyl | H | 235–36 | orange |
| 59 | 3-nitrophenyl | phenyl | H | 258–60 | yellow |
| 60 | " | 4-chlorophenyl | H | >300 | yellow |
| 61 | " | 3-methylphenyl | H | 209–11 | yellow |
| 62 | 2-nitrophenyl | phenyl | H | 212–14 | reddish yellow |
| 63 | " | 4-chlorophenyl | H | 244–46 | yellow |
| 64 | " | 3-methylphenyl | H | 194–96 | reddish yellow |
| 65 | 2-cyanophenyl | 4-chlorophenyl | H | 257–59 | reddish yellow |
| 66 | 4-cyanophenyl | phenyl | H | 267–69 | reddish yellow |
| 67 | " | 4-chlorophenyl | H | >300 | reddish yellow |
| 68 | " | 3-methylphenyl | H | 234–36 | yellow |
| 69 | 2-methylphenyl | phenyl | H | 213–41 | yellow |
| 70 | " | 4-chlorophenyl | H | 217–19 | yellow |
| 71 | " | 3-methylphenyl | H | 175–76 | yellow |
| 72 | " | 4-methylphenyl | H | 196–97 | yellow |
| 73 | 3-methylphenyl | phenyl | H | 190–92 | yellow |
| 74 | " | 4-chlorophenyl | H | 243–45 | yellow |
| 75 | " | 3-methylphenyl | H | 168–70 | yellow |
| 76 | " | 4-methylphenyl | H | 219–21 | yellow |
| 77 | 4-methylphenyl | phenyl | H | 217–19 | yellow |
| 78 | " | 4-chlorophenyl | H | 242–45 | yellow |
| 79 | " | 3-methylphenyl | H | 198–200 | yellow |
| 80 | " | 4-methylphenyl | H | 243–45 | yellow |
| 81 | 4-ethylphenyl | phenyl | H | 229–31 | yellow |
| 82 | " | 4-chlorophenyl | H | 243–45 | yellow |
| 83 | " | 3-methylphenyl | H | 225–30 | yellow |
| 84 | 2-trifluoromethylphenyl | phenyl | H | 205–07 | yellow |
| 85 | " | 4-chlorophenyl | H | 218–20 | yellow |
| 86 | 3-trifluoromethylphenyl | phenyl | H | 227–29 | yellow |
| 87 | " | 4-chlorophenyl | H | 223–25 | yellow |
| 88 | 4-methoxyphenyl | phenyl | H | 234–35 | yellow |
| 89 | " | 4-chlorophenyl | H | 243–44 | yellow |
| 90 | " | 3-methylphenyl | H | 201–02 | yellow |
| 91 | 4-ethoxyphenyl | phenyl | H | 242–43 | yellow |
| 92 | " | 4-chlorophenyl | H | 268–70 | yellow |
| 93 | " | 3-methylphenyl | H | 204–05 | yellow |
| 94 | 4(4'-chlorophenoxy)-phenyl | phenyl | H | 237–39 | yellow |
| 95 | 4(4'-chlorophenoxy)-phenyl | 4-chlorophenyl | H | 221–23 | yellow |
| 96 | 2,3-dimethylphenyl | phenyl | H | 199–200 | yellow |
| 97 | " | 4-chlorophenyl | H | 218–19 | yellow |
| 98 | " | 4-methoxyphenyl | H | 212–14 | yellow |
| 99 | 2-chlorophenyl | 4-methoxyphenyl | H | 188–90 | yellow |
| 100 | 2,4-dichlorophenyl | 4-chlorophenyl | H | 277–78 | yellow |

TABLE 1-continued

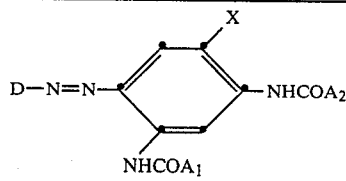

| Example | D | A₁ = A₂ | X | m.p. °C. | Shade in PES |
|---|---|---|---|---|---|
| 101 | 2,5-dichlorophenyl | 2,5-dichlorophenyl | H | 259–60 | yellow |
| 102 | " | 2,4-dichlorophenyl | H | 257–58 | yellow |
| 103 | 2,4-dimethyl-5-chlorophenyl | 3-methylphenyl | H | 221–22 | yellow |
| 104 | 4-phenylazophenyl | phenyl | H | 269–70 | orange |
| 105 | " | 4-chlorophenyl | H | 318–19 | orange |
| 106 | " | 3-methylphenyl | H | 237–38 | orange |
| 107 | 2-chlorophenyl | phenyl | Cl | 252–53 | yellow |
| 108 | " | 4-chlorophenyl | Cl | 273–74 | yellow |
| 109 | " | 3-methylphenyl | Cl | 233–34 | yellow |
| 110 | " | 4-methoxyphenyl | Cl | 245–46 | yellow |
| 111 | 2-amino-6-ethoxybenzthiazolyl | 4-chlorophenyl | H | 233–35 | brownish red |

EXAMPLE 112

99 parts by weight of polyamide-6 in the form of chips are coated dry with 1 part by weight of the finely divided dye of the formula

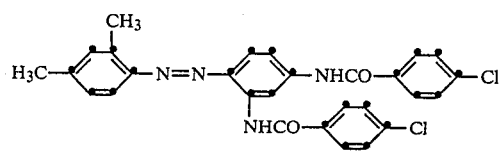

(m.p. 218°–219° C.) in accordance with Example 1 and then spun to filaments at 280°–285° C. in a melt spinning machine. The deep, pure yellow coloration obtained has excellent fastness properties.

EXAMPLES 113 TO 124

Good colorations are also obtained by repeating the procedure of Example 112 and using, instead of the dye employed therein, one of the dyes listed in Table 2.

TABLE 2

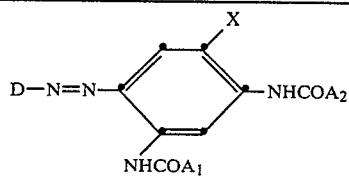

| Example | D | A₁ = A₂ | X | m.p. °C. | Shade in polyamide 6 |
|---|---|---|---|---|---|
| 113 | phenyl | 3-methylphenyl | H | 185–87 | yellow |
| 114 | 4-chlorophenyl | 3-methylphenyl | H | 210–11 | yellow |
| 115 | 2,3-dichlorophenyl | methyl | H | 251–52 | yellow |
| 116 | 2,4-dichlorophenyl | 4-methylphenyl | H | 259–60 | yellow/orange |
| 117 | 3,4-dichlorophenyl | 4-methylphenyl | H | 266–67 | yellow |
| 118 | 3,5-dichlorophenyl | methyl | H | >310 | yellow |
| 119 | 2,4-dimethylphenyl | phenyl | H | 199–200 | yellow |
| 120 | 2,4-dimethylphenyl | methyl | H | 239–40 | yellow |
| 121 | phenyl | 4-methylphenyl | CH₃ | 267–70 | yellow |
| 122 | 2-chlorophenyl | 2-chlorophenyl | H | 117–122 | yellow |
| 123 | 1-naphthyl | 3-methylphenyl | H | 202–203 | reddish yellow |
| 124 | 2-trifluoromethylphenyl | 4-chlorophenyl | H | 218–220 | yellow |

EXAMPLE 125

1% by weight of the dye of the formula (m.p. 251°–253° C.) is mixed with polyethylene terephthalate as in Example 1 and the coloured granules are spun to filaments. The strong, pure yellow coloration obtained has excellent fastness properties.

The dye of the above constitution may be obtained in simple manner by acylation of 4-amino-2-benzoylamino-4'-chlorazobenzene with 4-toluylyl chloride.

EXAMPLE 126

The dye of the formula

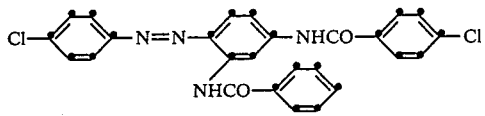

(m.p. 230°–232° C.) gives fast, yellow colorations in PES by carrying out the same procedure as in Example 125.

EXAMPLE 127

1 part by weight of the dye of Example 28, 10 parts by weight of titanium dioxide (KRONOS Titanium White RN 56 P ®) and 100 parts by weight of polystyrene granules (Polystyrene 165 H BASF ®) are mixed in a closed vessel for 15 minutes on a roller gear table and the mixture is then extruded twice at 200° C. and granulated.

The coloured granules are then processed to sheets in an automatic injection moulding machine. Strongly coloured reddish yellow mouldings are obtained.

Mouldings of less strong reddish coloration are obtained on similar application of the dye of Example 9.

EXAMPLE 128

1 part by weight of the dye of Example 9, 10 parts by weight of titanium dioxide (KRONOS Titanium White RN 56 P ®) and 100 parts by weight of ABS copolymer (Teluran 877 T ®) are processed by the method of Example 127 to give yellow mouldings.

EXAMPLE 129

1 part by weight of the dye of Example 1, 100 parts by weight of titanium dioxide (KRONOS Titanium White RN 56 P ®) and 1000 parts by weight of low pressure polyethylene are mixed in a high-speed rotary dispersing unit ("Gelimat") and subsequently pressed at 200° C. to sheets. Yellow mouldings are obtained.

EXAMPLE 130

A mixture of 3.1 g of benzoyl chloride and 3.85 g of 4-chlorobenzoyl chloride in 20 ml of chlorobenzene is added dropwise over 15 minutes at 100°–110° C. to a solution of 4.95 g of 2-chloro-2',4'-diaminoazobenzene in 50 ml of chlorobenzene. The resultant suspension is heated to reflux temperature and stirred for 6 hours at this temperature to give a brownish yellow solution, from which a yellow crystalline product precipitates on cooling to room temperature. The precipitate is filtered with suction and washed successively with a small amount of chlorobenzene, then thoroughly with alcohol, 2% sodium carbonate solution and finally with water, then dried at 80° C. in vacuo. Yield: 7.4 g of an acylation mixture having a melting range of 180°–211° C., which gives yellow colorations of good fastness properties in PES in accordance with the procedure of Example 1.

EXAMPLE 131

In accordance with the particulars of Example 130, 4.95 g of 2-chloro-2',4'-diaminoazobenzene are acylated with a mixture of 5.1 g of 4-methylbenzoyl chloride and 1.92 g of 4-chlorobenzoyl chloride, to give 7 g of a yellow crystalline colorant mixture with a melting range of 175°–209° C. which gives yellow colorations of good fastness properties in PES.

What is claimed is:

1. A process for the mass coloration of organic polymers, which process comprises incorporating into said polymer in the melt an azo compound of the formula I

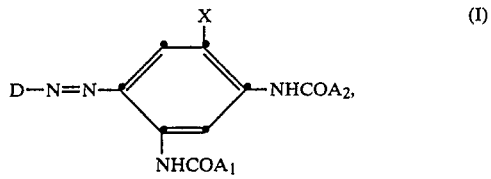

wherein d is the radical of a carbocyclic aromatic or heterocyclic aromatic diazo component, X is hydrogen, halogen, methyl or methoxy, and each of $A_1$ and $A_2$ independently of the other is $C_1$–$C_6$alkyl, phenyl or phenyl which is substituted by halogen, $C_1$–$C_4$alkyl, methoxy, ethoxy, phenyl or phenoxy.

2. A process according to claim 1, wherein D is the radical of a carbocyclic aromatic diazo component.

3. A process according to claim 1, wherein D is unsubstituted phenyl or phenyl which is substituted by one or two identical or different members selected from the group consisting of halogen, $C_1$–$C_6$alkyl, $C_1$–$C_6$alkoxy, phenoxy, cyano, nitro, phenylazo and trifluoromethyl, and X is hydrogen, halogen, methyl or methoxy, and each of $A_1$ and $A_2$ independently of the other is $C_1$–$C_6$alkyl, phenyl or phenyl which is substituted by halogen, $C_1$–$C_4$alkyl, methoxy, ethoxy, phenyl or phenoxy.

4. A process according to claim 1, wherein D is unsubstituted phenyl or phenyl which is substituted by one or two identical or different members selected from the group consisting of chlorine, $C_1$–$C_3$alkyl, $C_1$–$C_3$alkoxy, phenoxy, cyano, nitro, phenylazo and trifluoromethyl, and X is hydrogen, chlorine, methyl or methoxy, and each of $A_1$ and $A_2$ independently of the other is $C_1$–$C_3$alkyl, unsubstituted phenyl or phenyl which is substituted by chlorine, $C_1$–$C_4$alkyl, methoxy, ethoxy or phenyl.

5. A process according to claim 1, wherein D is unsubstituted phenyl or phenyl which is substituted by one or two identical or different members selected from the group consisting of chlorine, methyl, ethyl, methoxy, ethoxy, phenoxy, cyano, nitro, phenylazo and trifluoromethyl, and X is hydrogen, and $A_1$ and $A_2$ are the same and are unsubstituted phenyl or phenyl which is substituted by a methyl, tert-butyl or phenyl group or by one or two chlorine atoms.

6. A process according to claim 1, wherein D is phenyl which is substituted by one or two chlorine atoms and X is hydrogen, $A_1$ and $A_2$ are the same and are unsubstituted phenyl or phenyl which is substituted by one chlorine atom.

7. An organic polymer which contains an azo compound of the formula I as claimed in claim 1.

8. A linear polyester which contains an azo compound of the formula I as claimed in claim 1.

9. A linear polyamide which contains an azo compound of the formula I as claimed in claim 1.

* * * * *